(12) United States Patent
Song (10) Patent No.: US 8,757,240 B1
(45) Date of Patent: Jun. 24, 2014

(54) SUNSCREEN FOR VEHICLE

(71) Applicant: Jae Cheon Song, Duluth, GA (US)

(72) Inventor: Jae Cheon Song, Duluth, GA (US)

(73) Assignee: Jae Cheon Song, Duluth, GA (US)

( * ) Notice: Subject to any disclaimer, the term of this patent is extended or adjusted under 35 U.S.C. 154(b) by 0 days.

(21) Appl. No.: 13/968,667

(22) Filed: Aug. 16, 2013

(51) Int. Cl.
*B60J 1/20* (2006.01)

(52) U.S. Cl.
USPC ............... 160/370.21; 160/DIG. 2; 296/136.1

(58) Field of Classification Search
USPC ............. 160/370.23, 370.21, DIG. 1, DIG. 2, 160/DIG. 3; 296/95.1, 136.01, 136.02, 296/136.1, 136.13; 150/168
See application file for complete search history.

(56) References Cited

U.S. PATENT DOCUMENTS

| | | | | |
|---|---|---|---|---|
| 2,614,630 A * | 10/1952 | Moszelt | ................... | 160/370.21 |
| 3,276,512 A * | 10/1966 | Gallagher | .................. | 160/368.1 |
| 4,406,320 A * | 9/1983 | Bingham | ................. | 160/370.21 |
| 4,597,608 A * | 7/1986 | Duffy | .......................... | 296/95.1 |
| 4,848,825 A * | 7/1989 | Niernberger | ................. | 296/95.1 |
| 4,877,074 A * | 10/1989 | Castellano | ................. | 160/84.04 |
| 4,948,192 A * | 8/1990 | Sohne | .......................... | 296/95.1 |
| 4,972,892 A * | 11/1990 | Yeh | ................................. | 150/166 |
| 5,035,460 A * | 7/1991 | Huang | ......................... | 296/95.1 |
| 5,292,167 A * | 3/1994 | Hellman | ...................... | 296/95.1 |
| 5,401,074 A * | 3/1995 | Timerman | ............... | 296/136.02 |
| 5,570,735 A * | 11/1996 | Chu | ......................... | 160/370.23 |
| 5,615,923 A * | 4/1997 | Madison | ...................... | 296/95.1 |
| 5,692,554 A * | 12/1997 | Huang | .................... | 160/370.23 |
| 6,241,303 B1 * | 6/2001 | Yee | ................................. | 296/95.1 |
| 6,289,968 B1 * | 9/2001 | Karten et al. | ............ | 160/370.23 |
| 6,705,337 B1 * | 3/2004 | Peckham | .................... | 135/88.07 |
| 6,758,003 B2 * | 7/2004 | Zheng | .............................. | 40/610 |
| 7,718,923 B1 * | 5/2010 | Hansen et al. | ................. | 219/203 |
| 7,823,953 B2 * | 11/2010 | Haas | ............................. | 296/95.1 |
| 8,132,603 B2 * | 3/2012 | Hogan | .......................... | 150/168 |
| 8,430,445 B1 * | 4/2013 | Williams | ...................... | 296/95.1 |
| 8,584,719 B2 * | 11/2013 | Rodriguez | .................... | 150/166 |
| 2007/0257504 A1 * | 11/2007 | Aguilar | ......................... | 296/97.7 |
| 2008/0197122 A1 * | 8/2008 | Gober | ........................... | 219/203 |
| 2009/0102230 A1 * | 4/2009 | Pehrson | .................... | 296/136.13 |

* cited by examiner

*Primary Examiner* — Katherine Mitchell
*Assistant Examiner* — Johnnie A Shablack
(74) *Attorney, Agent, or Firm* — Lowe Hauptman & Ham, LLP (57) ABSTRACT

A sunscreen for the windshield of a vehicle includes a sunscreen sheet configured to be opaque to solar radiation, a first band attached to the top of the sunscreen sheet and configured to adhere the sunscreen sheet to the windshield, a second band attached to below the middle of the sunscreen sheet and configured to adhere the sunscreen sheet to the windshield, and first and second hook and loop fasteners attached to both ends of the second band and configured to be respectively tethered to each side mirror of the vehicle.

17 Claims, 9 Drawing Sheets

SUNSCREEN FOR VEHICLE

TECHNICAL FIELD

This present disclosure is related to a sunscreen for a vehicle, and more particularly, a sunscreen for protecting the interior of motor vehicles against the sun's radiation.

BACKGROUND

Sunscreens for vehicles can be categorized into two categories. The first category covers sunscreens that are intended to keep the sun's radiation from damaging the interior of the vehicle or to prevent the interior of the vehicle from becoming excessively hot when the vehicle is not in use. The second category covers sunscreens that are intended to protect occupants of the vehicle from irritating radiation of the sun when the vehicle is in use. The present application relates to both categories of sunscreens.

A well-known sunscreen of the first category is a foldable sun shield for vehicles that comprises a substantial rectangular piece of cardboard that is folded along a plurality of fold lines extending in the vertical direction so that the sun shield can be folded into a small package for storage or unfolded into a shape that approximately fits the front windshield of an automobile. Disadvantages of this device include the fact that the disclosed sun shield does not fit precisely within most windshields, thus allowing some of the sun's radiation to enter in around the shield; the device is difficult to mount in some motor vehicles, particularly those wherein the rear view minor is mounted to the windshield directly; and the disclosed sun shield is easily bent or damaged thus deteriorating its effectiveness.

Another automobile sun shield of the first category is a flexible sheet comprised of a metalized plastic film that is specifically formed to the exact shape of a windshield. The flexible sheet is provided at several locations with one-half of a conventional hook and loop (VELCRO) fastener. The other half of the hook and loop fastener is mounted on the windshield of the automobile at locations corresponding to the locations on the flexible sheet having the other halves of the hook and loop fasteners. Disadvantages of that windshield screen include the fact that the flexible sheet must be custom designed for each model of automobile, thus minimizing the ability to mass produce the windshield effectively; and that the placement of the hook and loop fasteners must be carefully aligned between the windshield and the flexible sheet.

There are also a large number of products on the market that are intended to be mounted to the windshield of a vehicle in order to prevent sun ray. Such devices are usually mounted to the windshield by means of suction cups or adhesive tape. Such sun shields are expensive, difficult to mount, and/or difficult to remove and store when not in use.

SUMMARY

Exemplary embodiments relate to a sunscreen.

A sunscreen for a windshield of vehicle, according to some embodiments comprises a sunscreen sheet configured to be opaque to solar radiation, a first band attached to the top of the sunscreen sheet and configured to adhere the sunscreen sheet to the windshield, a second band attached to below the middle of the sunscreen sheet and configured to adhere the sunscreen sheet to the windshield, and first and second hook and loop fasteners attached to each ends of the second band and configured to be tethered to each side minors of the vehicle.

A sunscreen for a windshield of a vehicle, according to some embodiments comprises a sunscreen sheet configured to be opaque to solar radiation, a plurality of panels attached to the sunscreen sheet and configured to be opaque to solar radiation, wherein each of the plurality of panels includes a shock absorbing material, a first band attached to the top of the sunscreen sheet and configured to adhere the sunscreen sheet to the windshield, a second band attached to below the middle of the sunscreen sheet and configured to adhere the sunscreen sheet to the windshield, and first and second hook and loop fasteners attached to both ends of the second band and configured to be respectively tethered to each side mirror of the vehicle.

A sunscreen for a windshield of a vehicle, according to some embodiments comprises a sunscreen sheet configured to be opaque to solar radiation, a first band attached to the top of the sunscreen sheet and configured to adhere the sunscreen sheet to the windshield, a second band attached to below the middle of the sunscreen sheet and configured to adhere the sunscreen sheet to the windshield, and first and second detachably fastening means respectively attached to each end of the second band for tethering the each end of the second band to each side mirror of the vehicle.

DETAILED DESCRIPTION

Hereinafter, various embodiments will be described in detail with reference to the accompanying drawings. The figures are provided to enable those of ordinary skill in the art to make and use the exemplary embodiments.

Figure 1:
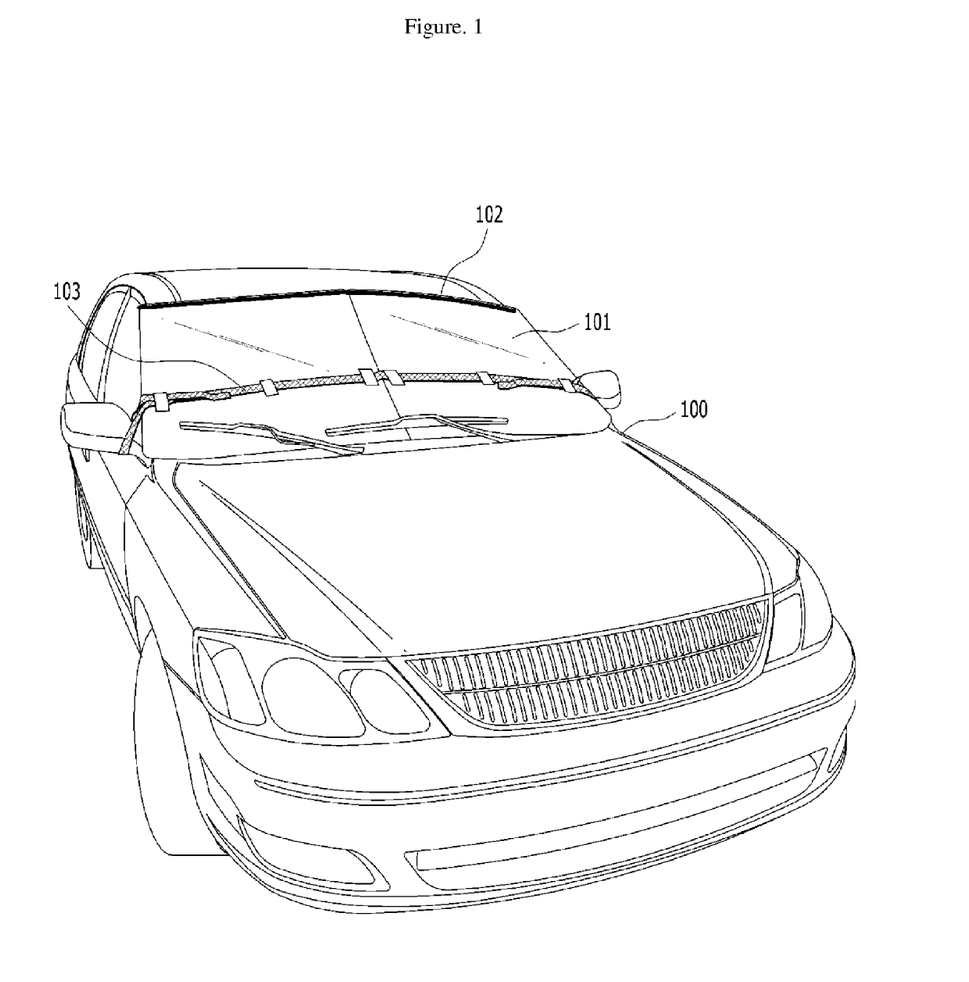
FIG. 1 is a perspective view showing a sunscreen mounted on a vehicle according to some embodiments.

FIG. 1 is a perspective view showing a sunscreen mounted on a vehicle according to some embodiments.

Referring to FIG. 1, a sunscreen 100 is mounted on the vehicle and includes a sunscreen sheet 101, a first band 102, and second band 103.

According to some embodiments, the sunscreen 100 is mounted on the vehicle for protecting the vehicle against sun radiation. In addition to the protection against sun radiation, the sunscreen also protects the vehicle, especially a windshield of the vehicle, against shock, rain, and dust.

To increase an effect of the protections, the sunscreen is tightly adhered to the windshield of the vehicle by elastic force of the first band 102 and second band 103. In some embodiments, the first band 102 and second band 103 include flexible, stretchable and elastic material, and further, the first band 102 is tethered to the inside of the vehicle, and the second band 103 is tethered to each side mirrors of the vehicle. Thus, the first and second bands make the sunscreen to be tightly adhered to the windshield of the vehicle.

Figure 2:
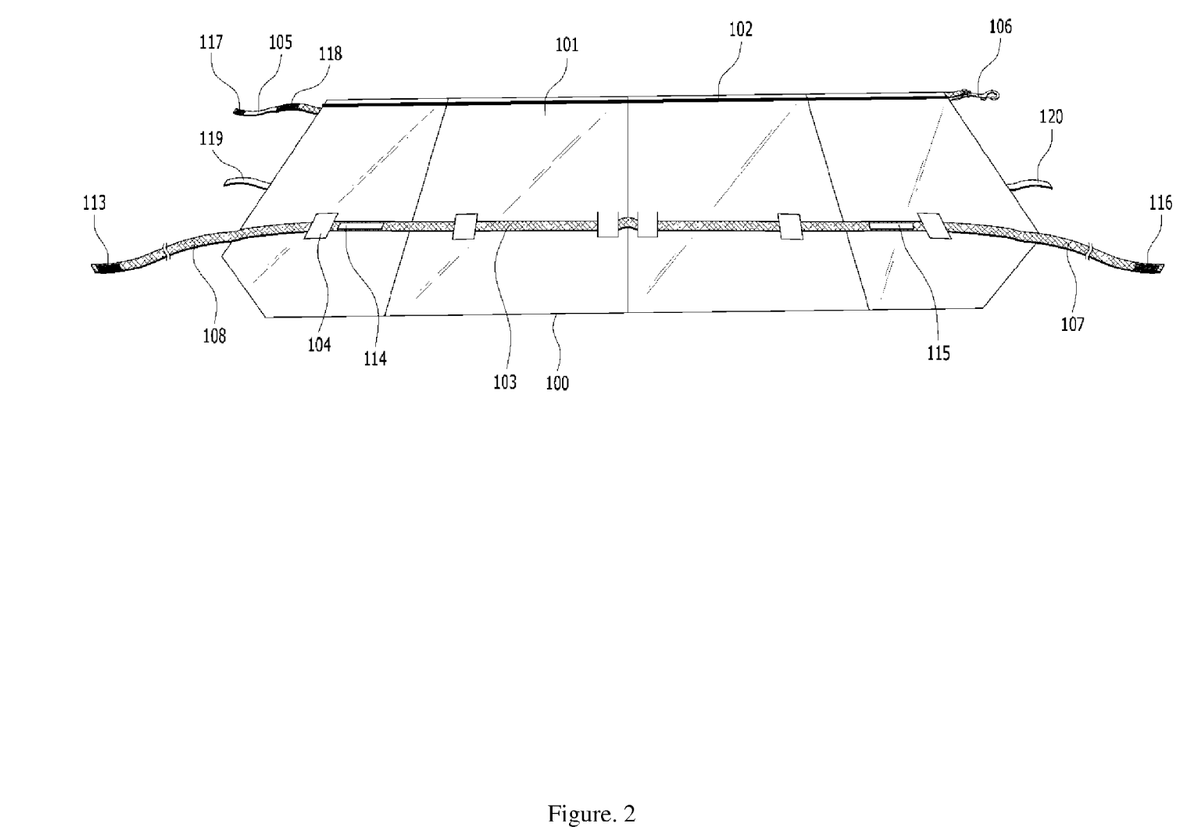
FIG. 2 is a perspective view showing a front side of a sunscreen according to some embodiments.

FIG. 2 is a perspective view showing a front side of a sunscreen according to some embodiments.

With reference to FIG. 2, a sunscreen 100 includes a sunscreen sheet 101, a first band 102, a second band 103, a fixing tape 104, a first hook and loop fastener 107, a second hook and loop fastener 108, a third hook and loop fastener 105, a hook portion 106, a first fixing strap 119 and a second fixing strap 120.

In some embodiments, a sunscreen sheet 101 is configured to be opaque to solar radiation. Further, the sunscreen sheet 101 includes waterproofing material. The sunscreen sheet is made of a material which has waterproof characteristic and insulates from heat or cold, e.g., polyester. Thus, the sunscreen sheet protects the vehicle against sun radiation, water or damage.

The first band 102 is attached to the top of the sunscreen sheet 101 to adhere the sunscreen sheet to the windshield. In some embodiments, an end of the sunscreen sheet 101 is rolled to form a tube, and the first band 102 is inserted to the inside of the tube. To increase the adherence of the sunscreen 100 to the windshield, the first band 102 includes flexible, stretchable and elastic material, such as a foam, fiberglass, urethane, rubber, or similar material.

A second band 103 is attached to below the middle of the sunscreen sheet 101 to adhere the sunscreen sheet 101 to the windshield of the vehicle. The second band is fixed on the sunscreen sheet 101 by a plurality of the fixing tapes. The plurality of fixing tapes 104 is attached to the sunscreen sheet 101.

Figure 6:
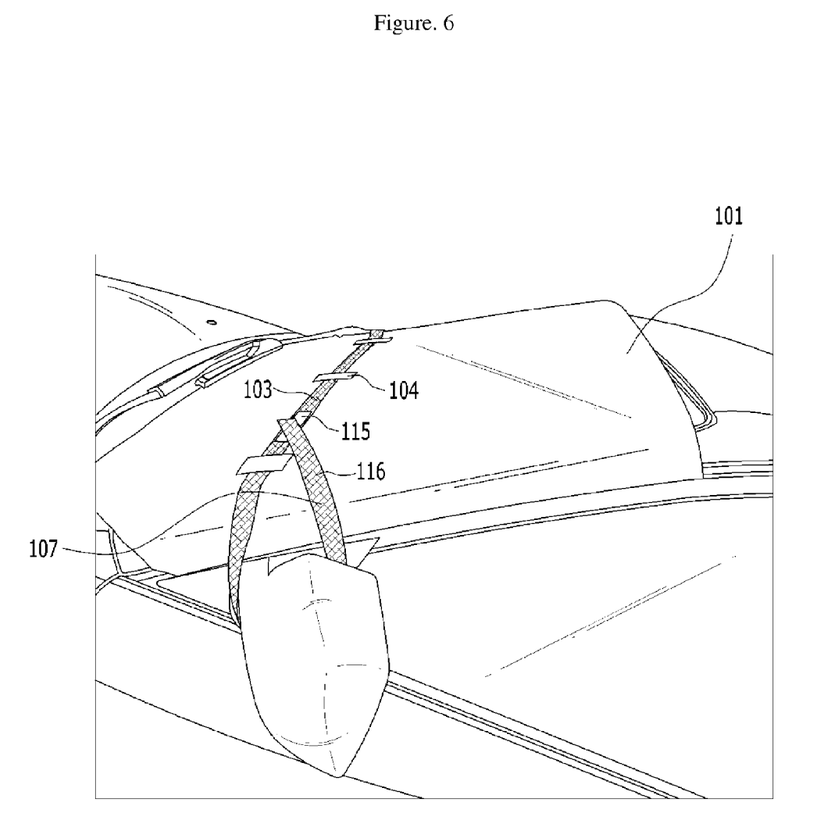
FIG. 6 is a perspective view showing one side of a sunscreen mounted on a vehicle according to some embodiments.

The first hook and loop fastener 107 and second hook and loop fastener 108 are respectively attached to both ends of the second band 103. The first hook and loop fastener 107 and second hook and loop fastener 108 are configured to be tethered to both side mirrors of the vehicle, as shown in FIG. 6. One end of the second band 103 is extended to form a loop such that a male tape 113 is fixed with a female tape 114. The other end of the second band 103 is extended to form a loop such that a male tape 116 is fixed with a female tape 115. A third hook and loop fastener 105 is attached to an end of the first band 102, and the third hook and loop fastener 105 is configured to be tethered to the inside of vehicle. The first hook and loop fastener 107, second hook and loop fastener 108, and third hook and loop fastener 105 include hook and loop tapes to form loops. The first hook and loop fastener 107 includes the male tape 116 with a hook on at least one side and the female tape 115. When the male tape 116 and the female tape 115 are pressed together they interlock to form a loop. Likewise, the second hook and loop fastener 108 includes the male tape 113 and the female tape 114, and the third hook and loop fastener 115 includes a male tape 117 and a female tape 118. In some embodiments, the male and female tapes comprised of a male Velcro tape and female Velcro tape, respectively. The first hook and loop fastener 107, second hook and loop fastener 108, and third hook and loop fastener 105 are opened when the sunscreen 100 is not mounted on the vehicle, as shown in FIG. 2. In some embodiments, the positions of the male tape and female tape in the first to third hook and loop fasteners are interchangeably swapped.

In some embodiments, the first, second and third hook and loop fasteners are comprised of detachably fastening elements such as but not limited to push buttons, hooks, buttons, zippers, magnets, rivets, snaps, clips, plastic cords, zip ties, and any combination of the aforementioned fastening elements.

The hook portion 106 is attached to an end of the first band 102. The hook portion 106 is configured to be hooked to the inside of vehicle. The details of the hook portion 106 are disclosed in FIGS. 5 and 7.

Each of the first and second fixing straps 119, 120 is placed on the right side and left side of the sunscreen 100, respectively. The first and second fixing straps 119, 120 are configured to further fix the sunscreen on the windshield of the vehicle. The details of the first and second fixing straps 119, 120 are disclosed in FIGS. 4 and 5.

Figure 3:
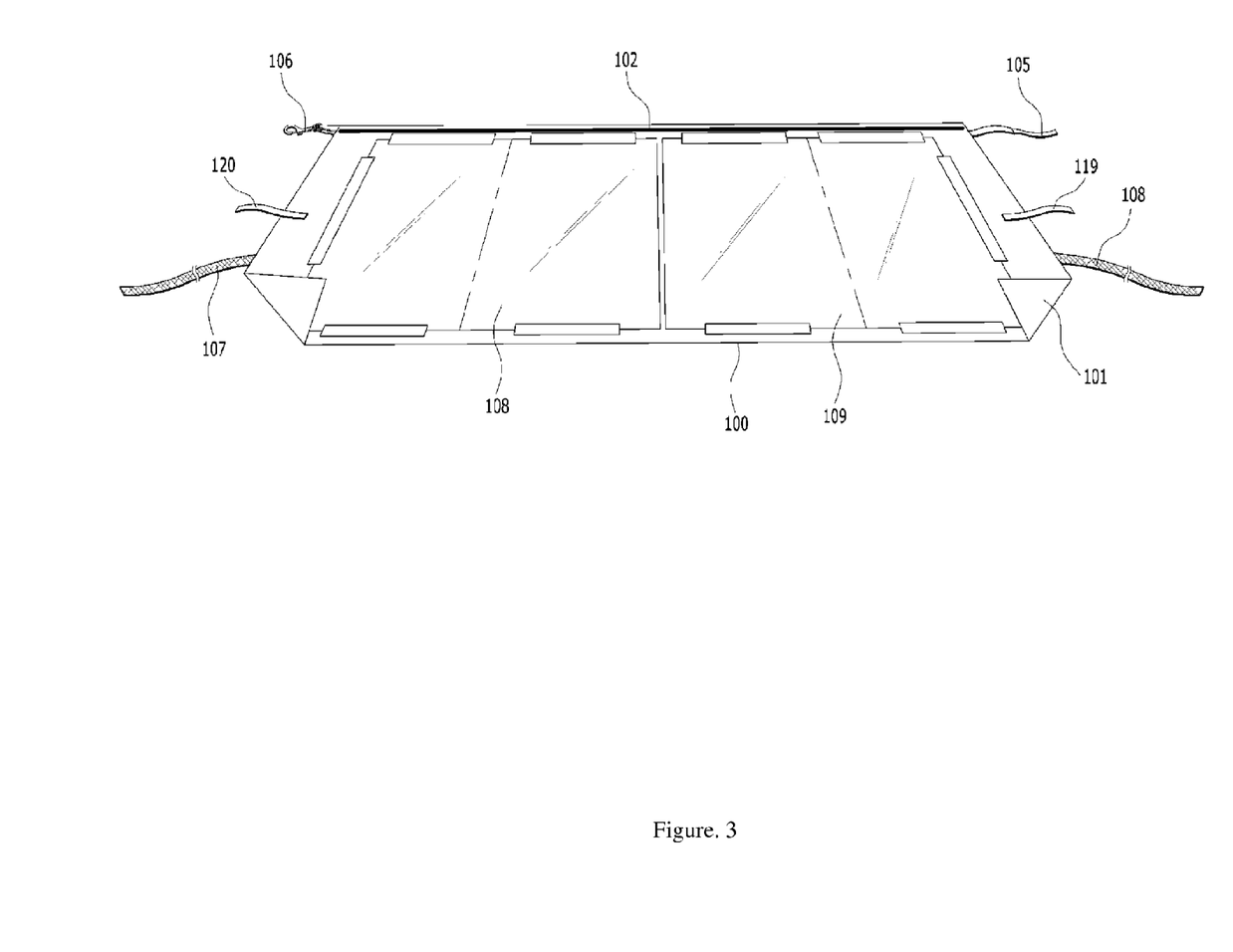
FIG. 3 is a perspective view showing a back side of a sunscreen according to some embodiments.

FIG. 3 is a perspective view showing a back side of a sunscreen according to some embodiments.

With reference to FIG. 3, a sunscreen 100 includes a sunscreen (cover) sheet 101, a first band (not shown), a first hook and loop fastener 107, a second hook and loop fastener 108, a third hook and loop fastener 105, a hook portion 106, a first fixing strap 119, a second fixing strap 120, and a plurality of panels 109, 110.

According to some embodiments, the sunscreen (cover) sheet 101, the first band 102, the first hook and loop fastener 107, the second hook and loop fastener 108, the third hook and loop fastener 105, the hook portion 106, and the first fixing strap 119, the second fixing strap 120 correspond to the elements of FIG. 2. The first fixing strap 119 and second fixing strap 120 are attached to the back side of the sunscreen sheet 101.

In some embodiments, the panels 109, 110 are attached to the cover sheet 101, and the panels also have a characteristic of opaque to solar radiation. Thus, the sunscreen protects the windshield and the interior against sun radiation and heat.

In some embodiment, the panels 109, 110 are made of a material which absorbs shock and insulates from heat or cold, e.g., Styrofoam, Polymers, and viscoelastic. Thus, the sunscreen 100 further protects a vehicle from a damage and/or frost. In particular, the sunscreen 100 protects the vehicle from the damage occurred by throwing stones to a windshield of the vehicle, by absorbing the shock of the damage by using the panels 109, 110. Further, the sunscreen 100 prevents forming of a frost on the windshield of the vehicle by insulating cold from the windshield, by using the panels 109, 110.

In some embodiment, each of the plurality of panels has a shape of trapezoid. By the trapezoid shape panels, the sunscreen (cover) sheet 101 conforms to the contour and shape of the windshield to be screened. In FIG. 3, the two panels are attached to the cover sheet. However, in some other embodiments, four panels are attached to the cover sheet, and the each of the panels is a shape of trapezoid. Thus, the sunscreen (cover) sheet 101 more conforms to the contour and shape of the windshield to be screened.

Figure 4:
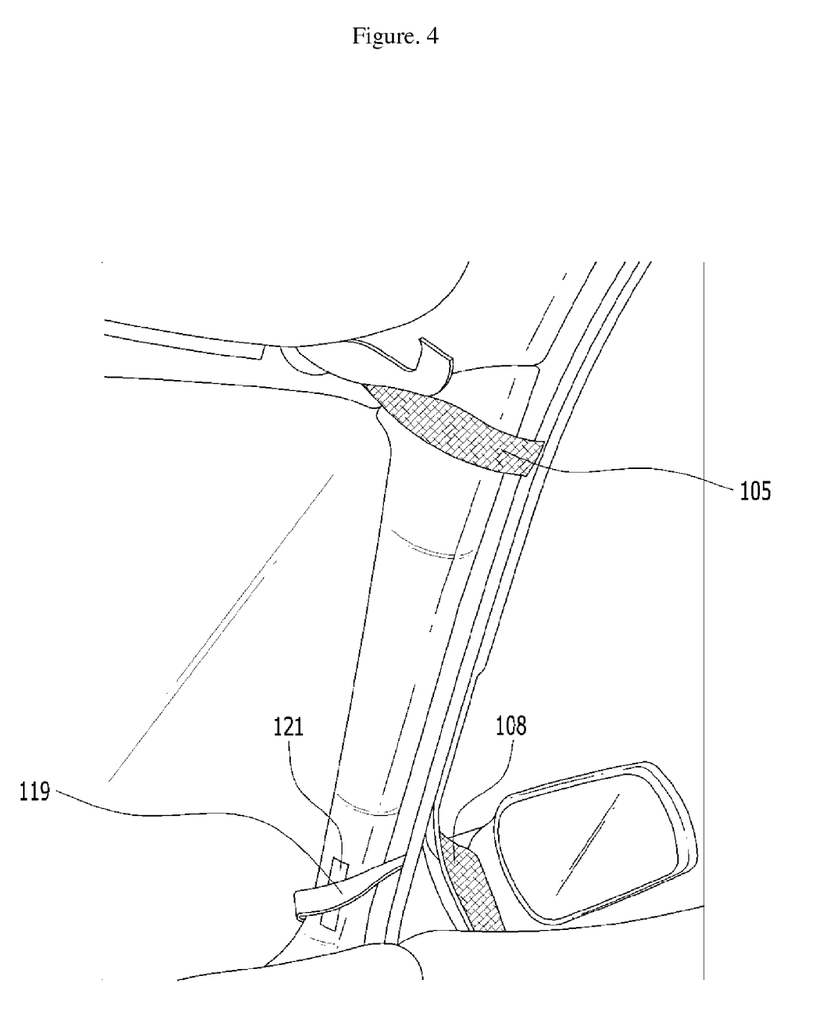
FIG. 4 is a perspective view showing one side of a sunscreen mounted on a vehicle according to some embodiments.

FIG. 4 is a perspective view showing one side of a sunscreen mounted on a vehicle according to some embodiments.

With reference to FIG. 4, the third hook and loop fastener 105 is tethered to a retainer of the front passenger's side sun visor, and the second hook and loop fastener 108 is tethered to one of side minors of the vehicle. The first fixing strap 119 is fixed on one of front pillars of the vehicle.

In some embodiments, a portion of the first fixing strap 119 includes a male tape, and a female tape is placed on the front pillar of the vehicle. Thus, when the male tape of the first fixing strap is pressed on the female tape of the front pillar, the first fixing strap is fixed on the front pillar to further suspend the sunscreen on the windshield of the vehicle.

An end portion of the third hook and loop fastener, which includes a male tape 117, as shown in FIG. 2, is looped through the retainer so that the end portion is to be attached to a female tape 118, as shown in FIG. 2, of the third hook and loop fastener 105. Thus, the third hook and loop fastener is fixed to suspend the first band on the windshield. In some embodiments, the sunscreen is more adhered to the windshield of the vehicle by an elastic force of the first band.

An end portion of the second hook and loop fastener, which includes a male tape 113, as shown in FIG. 2, is looped through a side minor so that the end portion is to be attached to a female tape 144, as shown in FIG. 2, of the second band 103. Thus, the second hook and loop fastener 108 is fixed to suspend the second band 103 on the windshield.

Figure 5:
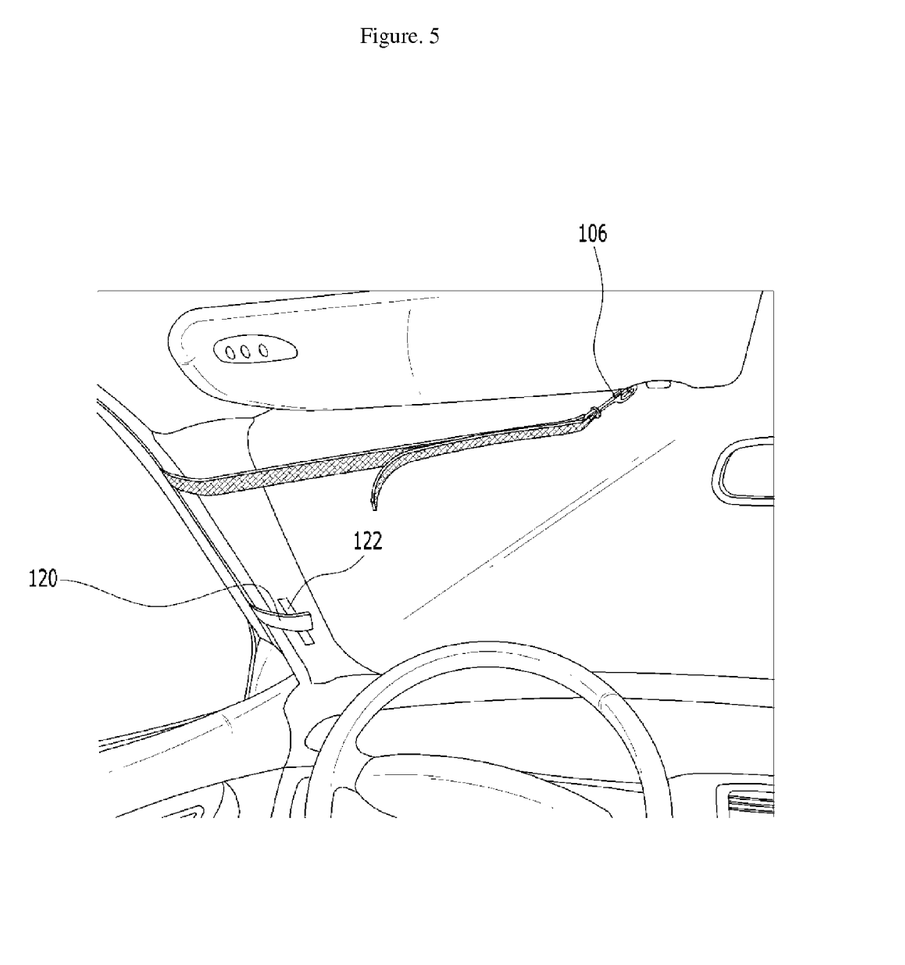
FIG. 5 is a perspective view showing one side of a sunscreen mounted on a vehicle according to some embodiments.

FIG. 5 is a perspective view showing one side of a sunscreen mounted on a vehicle according to some embodiments.

Figure 7:
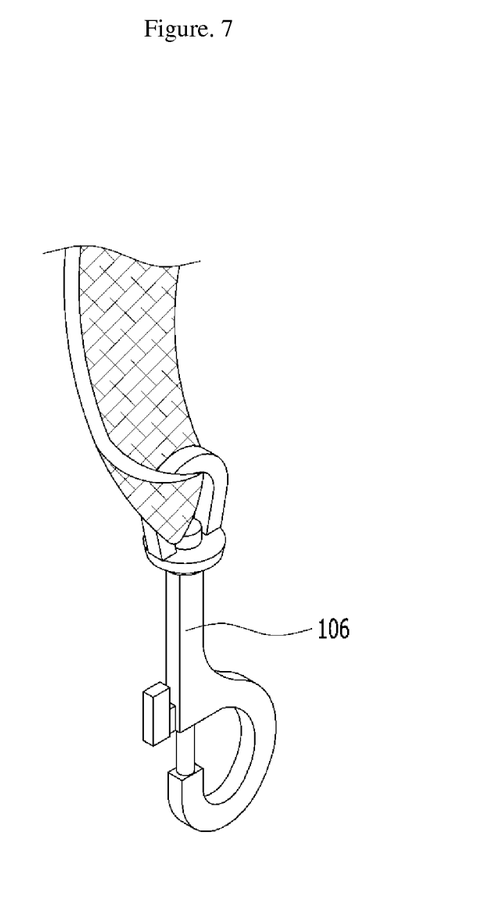
FIG. 7 is a perspective view showing a hook portion of a sunscreen according to some embodiments.

With reference to FIG. 5, the hook portion 106 is hooked to a retainer of the driver's side sun visor. The hook portion 106 is connected to an end of the first band 102 by looping the end of the first band through an opening of the hook portion, as shown in FIG. 7. In some embodiment, the end of the first band 102 includes a male tape and female tape to form a loop linked to the opening of the hook portion 106. The position of the hook portion 106 is adjustable by adjusting an attached portion between the male and female tapes.

The second fixing strap 120 is tethered to one of front pillars of the vehicle. In some embodiment, a portion of the second fixing strap includes a male tape (not shown), and a female tape 122 is placed on the front pillar of the vehicle. Thus, when the male tape (not shown) of the second fixing strap is pressed on the female tape 122 of the front pillar, the second fixing strap is fixed on the front pillar to further suspend the sunscreen on the windshield of the vehicle.

FIG. 6 is a perspective view showing one side of a sunscreen mounted on a vehicle according to some embodiments.

According to the adherence of the sunscreen as described above, the sunscreen sheet 101 is closely contacted to the windshield by the first hook and loop fastener 107, as shown in FIG. 6. Thus, the sunscreen more efficiently prevents water and dust from flowing freely onto the surface of the windshield.

FIG. 7 is a perspective view showing a hook portion of a sunscreen according to some embodiments.

With reference to FIG. 7, a hook portion 106 includes a hook and hinge. By this configuration of the hook portion 106, a user easily tethers the first band to the retaining portion of the sun visor. In some embodiment, the hook portion 106 is made of a metal material. The hook portion more firmly tethers the first band to the inside of the vehicle.

Figure 8:
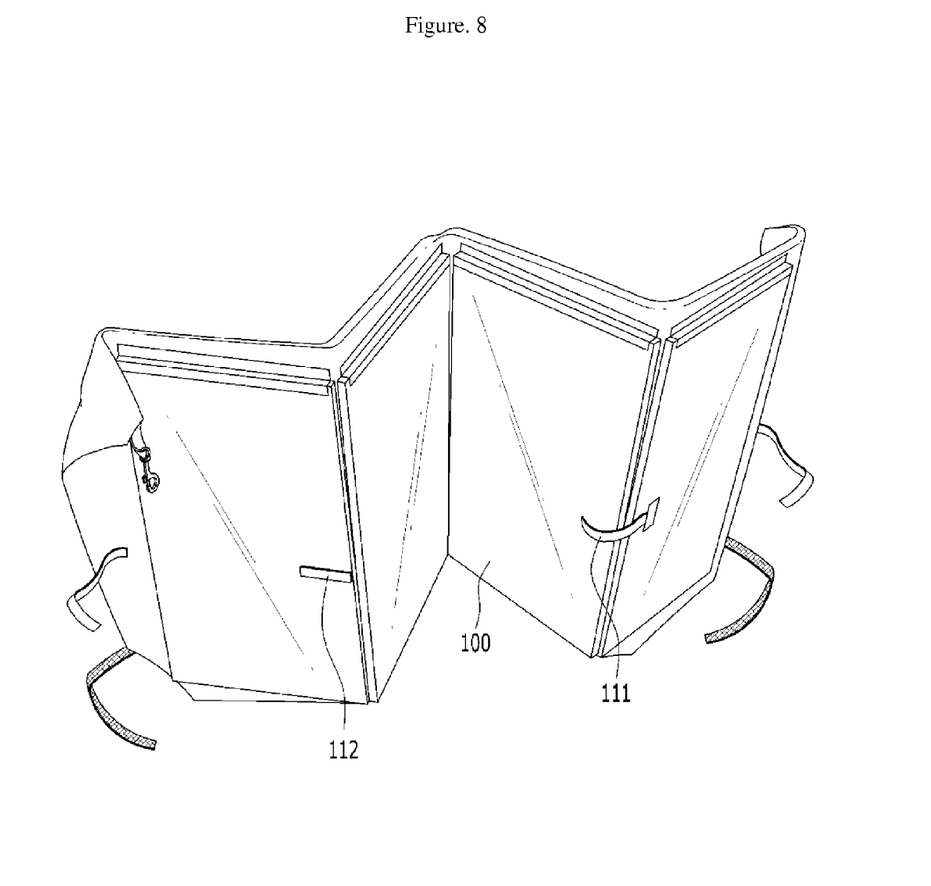
FIG. 8 is a perspective view showing a half folded sunscreen according to some embodiments.
Figure 9:
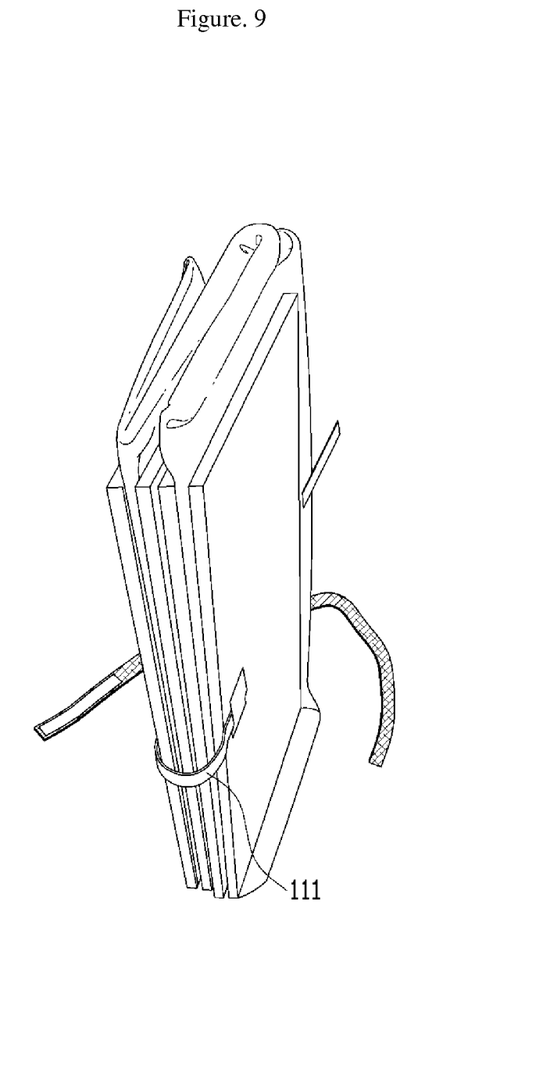
FIG. 9 is a perspective view showing a folded sunscreen according to some embodiments.

FIG. 8 is a perspective view showing a half folded sunscreen according to some embodiments, and FIG. 9 is a perspective view showing a folded sunscreen according to some embodiments.

With reference to FIGS. 8 and 9, the sunscreen 100 is configured to be folded. In some embodiments, the sunscreen sheet 101 is folded along with a boundary of each of the plurality of panels. The boundaries of the each of plurality of panels are folding lines. The folded sunscreen 100 is easily transported by a user.

Furthermore, the sunscreen includes a binding hook and loop fastener consisting of two tapes 111, 112 configured to bind the folded sunscreen sheet together. A male tape 111 is attached to a female tape 112, or vise versa, to bind the folded sunscreen.

The exemplary embodiments are explained above. However, the foregoing invention shall not be limited to the specific embodiments. A person of skill in the art will be able to affect various changes, substitutions of equivalents and aspects of the invention as broadly disclosed herein. The variant of the invention is not understood individually from the technological spirit and outlook of the invention.

The invention claimed is:

1. A sunscreen for a windshield of a vehicle, the sunscreen comprising:
    a sunscreen sheet which is opaque to solar radiation;
    a plurality of panels attached to the sunscreen sheet and opaque to solar radiation, each of the plurality of panels includes a shock absorbing material;
    a first band attached to the top of the sunscreen sheet and configured to adhere the sunscreen sheet to the windshield;
    a second band attached to below the middle of the sunscreen sheet and configured to adhere the sunscreen sheet to the windshield; and
    first and second hook and loop fasteners respectively attached to both ends of the second band, each hook and loop fastener is configured to be tethered to a respective one side mirror of the vehicle,
    wherein each of the first and second hook and loop fasteners includes
        a male tape located on the corresponding end of the second band, and
        a female tape located on a portion of the second band which is on the sunscreen sheet,
    wherein the male tape is configured to be fixed with the female tape when the second band is tethered to the corresponding side mirror of the vehicle, and
    wherein the second band extends across the full width of the sunscreen.

2. The sunscreen according to claim 1, wherein the first band includes a flexible, stretchable and elastic material.

3. The sunscreen according to claim 1, further comprising a plurality of fixing tapes attached to the sunscreen sheet and configured to fix the second band on the sunscreen sheet.

4. The sunscreen according to claim 1, wherein the sunscreen sheet is configured to conform to the contour and shape of the windshield to be screened.

5. The sunscreen according to claim 1, wherein the sunscreen sheet includes waterproofing material.

6. The sunscreen according to claim 1, wherein the first band comprises:
    a hook portion attached to an end of the first band and configured to be tethered to the inside the vehicle; and
    a third hook and loop fastener attached to another end of the first band and configured to be tethered to the inside the vehicle.

7. The sunscreen according to claim 6, wherein the hook portion is configured to be tethered to a retainer of a driver's side sun visor, and
    wherein the third hook and loop fastener is configured to be tethered to a retainer of a front passenger's side sun visor.

8. The sunscreen according to claim 6, wherein the hook portion comprises a hook and hinge.

9. The sunscreen according to claim 6, further comprising:
    a first fixing strap placed on one side portion of the sunscreen sheet and configured to be attached to one front pillar of the vehicle; and
    a second fixing strap placed on the other side portion of the sunscreen sheet and configured to be attached to the other front pillar of the vehicle.

10. The sunscreen according to claim 1, wherein the sunscreen sheet comprises:
   a cover sheet of flexible material which is opaque to solar radiation; and
   the plurality of panels attached to the cover sheet and which is opaque to solar radiation.

11. The sunscreen according to claim 10, wherein each of the plurality of panels has a trapezoid shape.

12. The sunscreen according to claim 10, wherein the plurality of panels includes four trapezoid panels.

13. The sunscreen according to claim 10, wherein the cover sheet is further configured to be folded along a boundary of each of the plurality of panels when not in use.

14. The sunscreen according to claim 1, wherein the sunscreen sheet is further configured to be folded.

15. The sunscreen according to claim 14, further comprising a binding hook and loop fastener configured to bind the folded sunscreen sheet when not in use.

16. The sunscreen according to claim 15, wherein the binding hook and loop fastener includes a male tape and female tape to fix the binding hook and loop fastener which binds the folded sunscreen sheet when not in use.

17. A sunscreen for a windshield of a vehicle, comprising:
   a sunscreen sheet which is opaque to solar radiation;
   a plurality of panels attached to the sunscreen sheet and opaque to solar radiation, each of the plurality of panels includes a shock absorbing material;
   a first band attached to the top of the sunscreen sheet and configured to adhere the sunscreen sheet to the windshield by fixing both ends of the first band on inside the vehicle;
   a second band attached to below the middle of the sunscreen sheet and configured to adhere the sunscreen sheet to the windshield;
   first and second hook and loop fasteners respectively attached to both ends of the second band, each hook and loop fastener is configured to be tethered to a respective one side minor of the vehicle;
   a first fixing strap placed on one side of the sunscreen sheet and configured to be attached to one front pillar of the vehicle at a location inside the vehicle; and
   a second fixing strap placed on the other side of the sunscreen sheet and configured to be attached to another front pillar of the vehicle at a location inside the vehicle,
   wherein each of the first and second hook and loop fasteners includes
       a male tape located on the corresponding end of the second band, and
       a female tape located on a portion of the second band which is on the sunscreen sheet, and
   wherein the male tape is configured to be fixed with the female tape which located outside the vehicle when the second band is tethered to the corresponding side mirror of the vehicle.

* * * * *